Feb. 11, 1941.  D. G. C. HARE  2,231,577
LOCATING CEMENT
Filed May 29, 1940
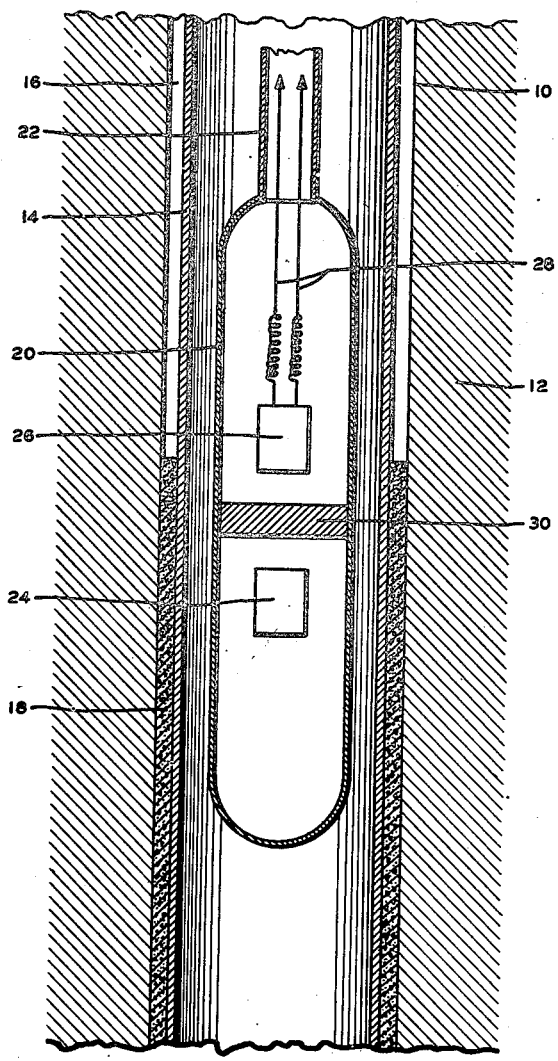
D.G.C. HARE
INVENTOR
BY *R J Dearborn*
*Daniel Stryker*
HIS  ATTORNEYS Patented Feb. 11, 1941

2,231,577

UNITED STATES PATENT OFFICE 2,231,577

LOCATING CEMENT

Donald G. C. Hare, Houston, Tex., assignor to Texaco Development Corporation, New York, N. Y., a corporation of Delaware Application May 29, 1940, Serial No. 337,863

3 Claims. (Cl. 166—21)

This invention relates to the locating of a body of cement and particularly to a method and apparatus for locating the upper end of a column of cement which has been placed around the outside of a casing in a bore hole or well. The principal object of the invention is to provide a method and apparatus through the use of which a device may be lowered or raised through the bore hole with a minimum of time and effort, and which device will provide an indication immediately when reaching the level of the upper surface of the cement.

It is frequently necessary to cement a considerable part of the depth of bore holes, such as those intended for the exploitation of oil sands. This cement is usually poured into the bore hole and subjected to pressure whereupon the cement will flow out of the bottom of the casing and then upwardly within the annular space between the casing and the formation, and it is obviously desirable to know the height to which the cement has risen behind the casing. The methods which have been used, such as the Schlumberger thermometric method for locating the level of the cement, frequently do not have the required accuracy and also require considerable time to function. It has also been proposed to mix with the cement material containing radioactive substances such as pitch-blend, carnotite or certain other ores which emit penetrated gamma rays and then to lower a detector through the hole, which instrument would indicate the position of the cement due to the instrument being responsive to the radioactive material contained in the cement. Obviously, these substances to be mixed with the cement are not always available.

In accordance with this invention, a quantity of a substance having a strong shielding action on slow neutrons such as boron which occurs in many inexpensive compounds such as borax, is introduced into the cement prior to its being forced into the annular space around the casing. After the cement has been placed in the hole, an instrument is lowered into the hole, this instrument containing a source of fast neutrons and a device for detecting these neutrons after they have penetrated and been scattered and slowed down in hydrogenic substances around the casing. When the instrument is lowered to such a position that it is opposite the top of the cement column, the detector will indicate a sudden decrease in the number of neutrons returned thereto and in this manner the top of the cement will be located.

For a better understanding of the invention, reference may be had to the accompanying drawing which is a sectional elevation of a portion of a bore hole which has been drilled through a formation and showing the instrument within the casing of the hole and substantially opposite the top of the cement column.

Referring to the drawing, a bore hole 10 is shown as having been drilled through a formation 12 and is provided with a casing 14. Part of the annular space 16 between the casing and the formation has been filled with cement as indicated at 18, a small quantity, say 5% of boron or borax having previously been mixed with the cement before the cement was placed in the hole.

An instrument having a suitable casing or shell 20 is adapted to be raised and lowered through the hole and within the casing 14 by means of a suitable string of tubing 22 or by means of a wire line or cable. Within the shell 20 is disposed a source of fast neutrons 24 which may be a mixture of radium and beryllium. A detector 26 is also disposed within the casing 20 and may be any device suitable for detecting slow neutrons such, for instance, as a Geiger-Muller counter suitable for the detection of slow neutrons or a boron-trifluoride ionization chamber. The detector 26 is connected by means of wires 28 to an indicating or recording device, not shown, at the surface. A lead shield 30 is disposed within the casing between the source 24 and the detector 26 to prevent the direct passage of unwanted radiation from the source to the detector.

In operation, as the instrument is lowered through the hole 10 and within the casing 14, the neutrons from the source 24 will be scattered and slowed down by the fluid in the hole and the surrounding formation, and a certain number of them will return to the detector 26 sufficiently slowed down so that they will be registered. These slow neutrons are strongly absorbed by substances such as boron and since a quantity of such a substance has been previously mixed with the cement 18, this layer of cement will have a strong shielding action on these slow neutrons. Thus, as the device is lowered through the casing but above the top of the cement 18 a certain somewhat varying number of slow neutrons will be detected by the device 26. When, however, the instrument is lowered so that it reaches the top of the cement 18, the number of counts registered by the detector 26 will decrease substantially due to the shielding or absorbing action of the cement on the neutrons. Therefore, knowing the depth of the instrument in the hole, the position of the top of the cement column 18 will be effectively indicated.

Obviously many other modifications and variations of the invention as hereinbefore set forth may be made without departing from the spirit and scope thereof, and therefore only such limitations should be imposed as are indicated by the appended claims.

I claim:

1. The method of locating the upper level of the cement placed in the annular space between the walls of a bore hole and a string of casing, which comprises mixing with the cement before it is placed in the hole a quantity of a substance capable of strongly absorbing slow neutrons, placing the treated cement in the hole so that it will fill part of the annular space between the formation and the casing, lowering an instrument containing a source of fast neutrons and a detector of slow neutrons through the uncemented portion of the hole and noting the change in the number of neutrons registered by the detector when the instrument reaches the cemented portion of the hole.

2. The method of locating the upper level of the cement placed in the annular space between the walls of a bore hole and a string of casing, which comprises mixing with the cement before it is placed in the hole a quantity of a substance capable of absorbing relatively slow penetrative particles, placing the treated cement in the hole so that it will fill part of the space between the casing and the surrounding formation, placing a source of penetrative particles in the hole, detecting the number of said particles scattered and slowed down in the surrounding formation and returned to the hole near said source, and moving the source and detecting means through the hole and observing the variation in the number of particles detected as the source and detecting means arrive at or leave the point where the top of the cement is located.

3. The method of locating the top of a cement column placed between the walls of a bore hole and a string of casing, which comprises mixing with the cement before it is placed in the hole a quantity of a boron compound, placing the treated cement in the hole so that it will fill part of the space between the casing and the surrounding formation, placing a source of penetrative particles in the hole, detecting the number of said particles scattered in the surrounding formation and returned to the hole, moving the source and detecting means through the hole and observing the variation in the number of particles detected as the source and detecting means arrive at or leave the point where the top of the cement is located, the boron in the cement serving to slow down and absorb some of said particles so that a lesser number of the scattered particles will return to the detecting means when said means is at a position in the hole opposite the cement.

DONALD G. C. HARE.